(12) United States Patent
Castinado et al.

(10) Patent No.: US 10,467,713 B2
(45) Date of Patent: Nov. 5, 2019

(54) COMMUNICATING PROPERTY DATA

(71) Applicant: Bank of America Corporation, Charlotte, NC (US)

(72) Inventors: Joseph B. Castinado, Northglenn, CO (US); Bonnie L. Dolan, Lincoln, CA (US)

(73) Assignee: Bank of America Corporation, Charlotte, NC (US)

( * ) Notice: Subject to any disclaimer, the term of this patent is extended or adjusted under 35 U.S.C. 154(b) by 1031 days.

(21) Appl. No.: 14/847,612

(22) Filed: Sep. 8, 2015

(65) Prior Publication Data

US 2017/0069042 A1 Mar. 9, 2017

(51) Int. Cl.
*G06Q 50/16* (2012.01)
*G06Q 20/14* (2012.01)

(52) U.S. Cl.
CPC .......... *G06Q 50/16* (2013.01); *G06Q 20/14* (2013.01)

(58) Field of Classification Search
CPC ................................................ G06Q 40/00
USPC ................................................... 703/38
See application file for complete search history.

(56) References Cited

U.S. PATENT DOCUMENTS

| | | | | |
|---|---|---|---|---|
| 6,088,686 A * | 7/2000 | Walker | ........ | G06Q 20/10 235/375 |
| 7,324,970 B2 * | 1/2008 | Magruder | ........ | G06Q 20/105 705/38 |
| 7,860,781 B1 * | 12/2010 | Bodi | ........ | G06Q 40/00 705/35 |
| 8,185,466 B2 * | 5/2012 | Martinez | ........ | G06Q 40/04 705/37 |
| 8,626,644 B2 * | 1/2014 | Greig, Jr. | ........ | G06Q 40/00 235/375 |
| 2002/0032626 A1 * | 3/2002 | DeWolf | ........ | G06Q 10/06 705/35 |
| 2002/0069160 A1 * | 6/2002 | Olin | ........ | G06Q 40/00 705/38 |
| 2002/0091621 A1 * | 7/2002 | Conklin | ........ | G06Q 20/10 705/37 |
| 2003/0144950 A1 * | 7/2003 | O'Brien | ........ | G06Q 40/02 705/38 |
| 2003/0212628 A1 * | 11/2003 | Kuttan | ........ | G06Q 40/02 705/38 |
| 2005/0149421 A1 * | 7/2005 | Marlowe-Noren | ........ | G06Q 40/00 705/35 |

(Continued)

OTHER PUBLICATIONS

U.S. Appl. No. 14/847,515, filed Sep. 8, 2015, Castinado et al.

*Primary Examiner* — Kirsten S Apple
(74) *Attorney, Agent, or Firm* — Michael A. Springs (57) ABSTRACT

A system for communicating property data, comprising one or more memories operable to store a lien data for a plurality of properties, the lien data including: an identification of a lien on a property, an identification of the holder of the lien, and a balance of debt associated with the lien; and one or more operable to receive a property payment request from a requesting party, the property payment request including an identification of a subject property; and one or more processors operable to: determine that the subject property is one of the plurality of properties stored on the one or more memories, determine one or more liens associated with the subject property, and determine the lien holder for each determined lien associated with the subject party.

20 Claims, 4 Drawing Sheets

(56) References Cited

U.S. PATENT DOCUMENTS

| | | | |
|---|---|---|---|
| 2005/0273406 A1* | 12/2005 | Lebda | G06Q 40/00 705/35 |
| 2007/0016519 A1* | 1/2007 | Blount, Jr. | G06Q 10/087 705/38 |
| 2007/0033126 A1* | 2/2007 | Cagan | G06Q 40/00 705/35 |
| 2007/0142925 A1* | 6/2007 | Heinzmann | G06F 17/30445 700/1 |
| 2007/0192237 A1* | 8/2007 | Duoos | G06Q 40/02 705/38 |
| 2008/0126267 A1* | 5/2008 | Rosen | G06Q 40/06 705/36 R |
| 2008/0243679 A1* | 10/2008 | McMurray | G06Q 40/02 705/38 |
| 2008/0249809 A1* | 10/2008 | Rosen | G06Q 40/00 705/4 |
| 2010/0228651 A1* | 9/2010 | Becerra | G06Q 30/04 705/34 |
| 2011/0191233 A1* | 8/2011 | Russo | G06Q 40/04 705/37 |
| 2012/0278256 A1* | 11/2012 | Williams | G06Q 40/06 705/36 R |
| 2014/0081672 A1* | 3/2014 | Chawla | G06Q 40/08 705/4 |
| 2014/0180907 A1* | 6/2014 | Blank | G06Q 40/025 705/38 |

* cited by examiner

FIG. 1

| Prop. Owner ID 202 | Lien ID 204 | Lien Type 206 | Prop.ID 208 | Lien Holder ID 210 | Lien Balance 212 | Update Needed 214 | Prop. Owner Acct. ID 216 |
|---|---|---|---|---|---|---|---|
| ABC123 | LIEN123 | Mort. | 123 4th St. City, State ZIP | FI987 | $123,456 | No | • A123<br>• B456<br>• C789 |
| ABC123 | LIEN456 | Mort. | 123 4th St. City, State ZIP | FI654 | $7,890 | Yes | • A123<br>• B456<br>• C789 |
| DEF456 | LIEN789 | Vehicle | VIN12345678 | FI987 | $1,234 | No | • D987 |

COMMUNICATING PROPERTY DATA

TECHNICAL FIELD

This disclosure relates generally to communicating property data, and more particularly to communicating property data related to obligations attached to the property.

BACKGROUND

Property, such as real-estate and vehicles, is often encumbered by liens. It is non-trivial and time consuming to determine whether a particular property has encumbrances, such as liens. The difficulty in determining whether a property is encumbered by liens is especially problematic when dealing with conveying the property and with insurance payments on property. For example, a property owner may demand rapid payment from an insurance company of an insurance claim on a property, however, if the property is encumbered by one or more liens, other parties (e.g., lien holders) may be entitled to a portion of the insurance payment.

SUMMARY OF EXAMPLE EMBODIMENTS

According to embodiments of the present disclosure, disadvantages and problems associated with providing internal services to external enterprises may be reduced or eliminated.

In certain embodiments, a system for communicating property data includes one or more interfaces operable to receive lien data, the lien data including an identification of a lien on a property, an identification of the holder of the lien, a balance of debt associated with the lien, and a repayment schedule for the amount of debt associated with the lien; and lien authentication data, the lien authentication data including one or more from the set comprising: a copy of an agreement memorializing the lien, a property title memorializing the lien, and a government record memorializing the lien; one or more memories communicatively coupled to the one or more interfaces, the one or more memories operable to store the received lien data and the received lien authentication data; and one or more processors communicatively coupled to the one or more memories, the one or more processors operable to: determine, based on the received lien authentication data, that the received lien data is valid, and determine, based on the received lien data, that the received balance of debt associated with the lien needs to be updated.

In particular embodiments, a system for communicating property data, comprising one or more memories operable to store a lien data for a plurality of properties, the lien data including: an identification of a lien on a property, an identification of the holder of the lien, and a balance of debt associated with the lien; and one or more interfaces communicatively coupled to the one or more memories, the one or more interfaces operable to receive a property payment request from a requesting party, the property payment request including an identification of a subject property; and one or more processors communicatively coupled to the one or more memories, the one or more processors operable to: determine that the subject property is one of the plurality of properties stored on the one or more memories, determine one or more liens associated with the subject property, and determine the lien holder for each determined lien associated with the subject party.

Certain embodiments of the present disclosure may provide one or more technical advantages having specific technical effects.

In certain embodiments, a system is operable to provide a centralized repository associating property with liens, thereby conserving the computational resources and bandwidth consumed by searching disparate resources to identify liens on a property.

In particular embodiments, a system is operable to determine an amount of debt associated with one or more liens on a property, thereby conserving the computational resources and bandwidth consumed by searching disparate resources to determine an amount of debt associated with a property.

In an embodiment, a system is operable to allocate a payment associated with a property between the property owner and lien holders, thereby conserving the computational resources and bandwidth consumed by searching disparate resources to determine payment allocations for the property owner and lien holders.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and for further features and advantages thereof, reference is now made to the following description taken in conjunction with the accompanying drawings, in which.

DETAILED DESCRIPTION

Embodiments of the present disclosure and its advantages are best understood by referring to FIGS. 1 through 4 of the drawings, like numerals being used for like and corresponding parts of the various drawings.

In an example, a system includes a lien holder interface module operable to receive lien data from lien holders and store the lien data in a centralized database. The lien holder interface module may be operable to determine liens associated with properties, debt balances associated with liens, and to interface with interested entities to disburse payments associated with property encumbered by liens to the lien holders and to the property owner.

Figure 1:
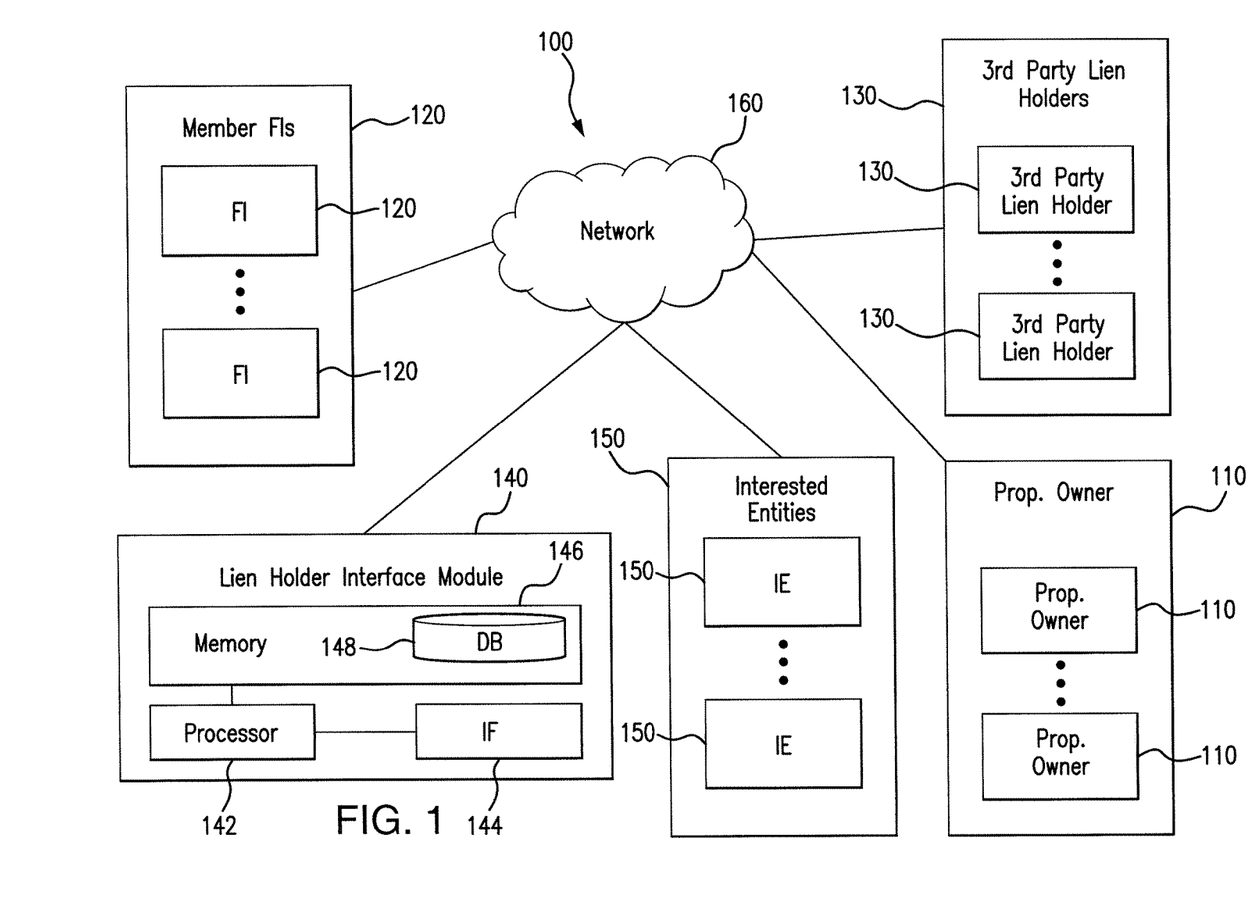
FIG. 1 illustrates an example system for communicating property data.

FIG. 1 illustrates an example system 100 for communicating property data. According to an embodiment, system 100 includes property owners 110, member financial institutions 120, third party lien holders 130, and lien holder interface module 140, interested entities 150, and network 160.

Property owners 110 represent entities that own property, for example, real-estate, vehicles, or any other type of property. Property owners 110 may be individuals, companies, or other entity that owns property. In an embodiment, property owners 110 may have an encumbered interest in a property. For example, a property may be encumbered with liens on the property, which represent a non-possessory security interest in the property. Liens may be memorialized in property ownership documents (e.g., a title), agreements between property owners 110 and lien holders, in government records (e.g., publically registered documents), or in any other suitable form. In certain embodiments, liens are associated with an amount of debt secured by property of property owners 110, and the debt may have a particular repayment schedule (e.g., an amortization schedule).

Member financial institutions 120 represent a plurality of financial institutions 132 that have entered into an agreement (e.g., a joint venture, contractual agreement, and/or other suitable agreement) to maintain a centralized repository (e.g., database 128 of lien holder interface module 140) of property information, such as identification of liens on property. Financial institutions 120 may include organizations such as commercial banks, savings and loan associations, credit unions, Internet banks, mutual fund companies, brokerage firms, credit card companies, or other entity. In certain embodiments, financial institutions 120 have different business units or subdivisions that handle different business activities.

Member financial institutions 120 may have liens on a number of properties (e.g., vehicles, real-estate, or other property) and communicate lien data to lien holder interface module 140. Lien data may include an identification of a lien on a property, an identification of the holder of the lien (e.g., the lien holder), an identification of the property subject to the lien (e.g., an address, a vehicle identification number ("VIN"), or other suitable property identifier), an identification of the type of property subject to the lien (e.g., car, boat, recreational vehicle, motorcycle, first home, second home, business, or other suitable property categorization), a balance of debt associated with the lien, a debt repayment schedule associated with the lien, an identification of the property owner (e.g., property owner 110), or any other suitable information associated with a lien or a property. Member financial institutions 120 may further communicate lien authentication data to lien holder interface module 140. Lien authentication data represents information that can be used (e.g., by lien holder interface module 140) to validate a lien, such as an agreement between the lien holder and the property owner memorizing the lien, a property title memorializing the lien, a government record memorializing the lien, or any other suitable information operable to validate a lien on a property.

Third party lien holders 130 represent lien holders that are not member financial institutions 120, but that hold liens on property. Third party lien holders 130 may include organizations such as commercial banks, savings and loan associations, credit unions, Internet banks, mutual fund companies, brokerage firms, credit card companies, vehicle dealerships, vehicle manufacturers, contractors, developers, or any other type of lien holder. In certain embodiments, third party lien holders 130 may submit lien data to lien holder interface module 140. For example, member financial institutions 120 may charge a fee for maintaining third party lien holder 130 lien data (e.g., in database 128 of lien holder interface module). The fee may be based on the type of property associated with the lien, the amount of debt associated with the lien, the particular third party lien holder 130, or any other suitable information. In certain embodiments, lien holder interface module 140 is operable to communicate fee requests, for example, to third party lien holders 130 or member financial institutions 120, and to receive payments on the communicated fee requests for example, to third party lien holders 130 or member financial institutions 120.

Lien holder interface module 140 represents a component of system 100 operable to maintain lien data received from one or more of member financial institutions 120 and third party lien holders 130. Lien holder interface module 140 may further be operable to receive requests for lien data from member financial institutions 120, third party lien holders 130, or interested entities 150. In certain embodiments, lien holder interface module 140 is operable to interface with one or more of property owners 110, member financial institutions 120, third party lien holders 130, and interested entities 150. Lien holder interface module 140 may include one or more processors 142, interfaces 144, memories 146, and databases 148.

In an embodiment, lien holder interface module 140 is operable to receive lien data and/or lien authentication data, for example, from member financial institutions 120 and/or third party lien holders 130. In certain embodiments, member financial institutions 120 have a relationship (e.g., a joint venture, contractual agreement, and/or other suitable agreement) such that lien data from each of the member financial institutions 120 is trusted. For example, member financial institutions 120 may not be required to submit lien authentication data to lien holder interface module 140, while third party lien holders 130 may be required to submit lien authentication data. Alternatively, member financial institutions 120 may be required to submit different lien authentication data to lien holder interface module 140 than third party lien holders 130. In particular embodiments, lien holder interface module 140 is operable validate lien data, for example, based on lien authentication data. Lien holder interface module 140 may compare received lien data to received lien authentication data to determine whether the lien data matches the lien authentication data to validate that the lien data is accurate. Lien holder interface module 140 may store received lien data and/or lien authentication data in database 148.

In certain embodiments, lien holder interface module 140 is operable to search database 148 and determine whether a property is listed in database 148, and if the property is listed to identify liens and lien data associated with the property. Lien holder interface module 140 may be operable to determine whether stored lien data is current or whether stored lien data needs to be updated. For example, a lien may be associated with a debt balance and a debt repayment schedule and lien holder interface module 140 may be operable to determine whether the debt balance needs to be updated based on the debt repayment schedule. If the lien balance has not been updated by the lien holder for a time period (e.g., for a time period longer than the payment periods described by the debt repayment schedule), lien holder interface module 140 may determine that the debt balance needs to be updated and send a message to the lien holder requesting an update to the lien data. In an embodiment, if lien data is not updated, lien holder interface module may designate it as unreliable and may not consider the lien data in operations (e.g., payment disbursements, lien searches, etc.) performed by lien holder interface module 140.

Lien holder interface module 140 may be operable to receive a property payment request (e.g., from interested entities 150), for example, a payment on an insurance claim associated with a property. In certain embodiments, lien holder interface module 140 searches database 148 for a property identified in a received payment request to determine whether there are associated liens. If lien holder interface module 140 determines that there are identified liens, it may determine lien balances associated with the identified liens. In an embodiment, lien holder interface module 140 may determine a total debt balance associated with a property based on the determined liens and lien balances associated with the property. Lien holder interface module 140 may be operable to determine whether a payment amount identified by the received payment request is greater than the determined total debt balance associated with the property, and may be operable to communicate the result to the interested entity 150 communicating the payment request.

In particular embodiments, lien holder interface module 140 is operable to receive payment related to a property (e.g., from interested entities 150) and disburse the payment to lien holders associated with the property and to the property owner associated with the property. For example, interested entity 150 may be an insurance company paying an insurance claim for a home that was destroyed in a fire. Lien holder interface module 140 may be operable to identify the property owner and lien holders associated with the property, determine a debt balance associated with each lien, and to disburse payment to the lien holders for the debt balance corresponding to each lien, and to disburse the remainder to the property owner. Accordingly, lien holder interface module 140 can function as a clearinghouse for payments related to property encumbered by liens. Further, lien holder interface module 140 can provide lien holders (e.g., member financial institutions 120 and/or third party lien holders) with a centralized repository of lien data for interested parties 150 to easily access. Interested entities 150 represent entities that have an interest in a property and may include insurers of the property, prospective buyers of the property, prospective lenders seeking the property as security on a loan, or any other suitable entity. In an example, insurance customers may demand rapid payment on an insurance claim in the event of damage to, or total loss of, a property. Insurance companies may compete by ensuring that customers receive rapid payment in the event of a covered insurance claim, however, properties may be encumbered by liens where the lien holders have an interest in an insurance payment related to property. It may be less burdensome for lien holders (e.g., member financial institutions 120 and third party lien holders 130) to be paid directly from property insurers than trying to recoup payment from the property owner. For example, if a vehicle was destroyed in an accident and the vehicle owner received an insurance payment for the value of the vehicle, but still had debt to a lien holder on the vehicle, the lien holder is unsecured and must try to recoup the debt directly from the property owner.

Network 160 represents any suitable network operable to facilitate communication between components of system 100, such as property owners 110, member financial institutions 120, third party lien holders 130, and lien holder interface module 140. Network 160 may include any interconnecting system capable of transmitting audio, video, electrical signals, optical signals, data, messages, or any combination of the preceding. Network 160 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100.

A module (e.g., module 140) may execute any suitable operating system such as IBM's zSeries/Operating System (z/OS), MS-DOS, PC-DOS, MAC-OS, WINDOWS, a .NET environment, UNIX, OpenVMS, or any other appropriate operating system, including future operating systems. The functions of a module may be performed by any suitable combination of one or more servers or other components at one or more locations. In embodiments where modules represent a server, the server may be a private server, and the server may be a virtual or physical server. Additionally, a module may include any suitable component that functions as a server.

Components of system 100, such as real-time processing module 140, may include one or more processors. A processor represents any computing device, such as processors 142, configured to control the operation of one or more components of system 100. A processor may comprise one or more processors and may be a programmable logic device, a microcontroller, a microprocessor, any suitable processing device, or any suitable combination of the preceding. A processor includes any hardware or software that operates to control and process information received by a component of system 100. In certain embodiments, a processor communicatively couples to other components of system 100, such as a module (e.g., module 140), an interface (e.g., interface 144), a memory (e.g., memory 146), a database (e.g., database 148), or any other suitable component.

An interface represents any device, such as interface 144 operable to receive input, send output, process the input or output, or perform other suitable operations for a component of system 100. An interface includes any port or connection, real or virtual, including any suitable hardware or software, including protocol conversion and data processing capabilities, to communicate through network 160. In certain embodiments, an interface includes a user interface (e.g., physical input, graphical user interface, touchscreen, buttons, switches, transducer, or any other suitable method to receive input from a user).

A memory represents any device, such as memory 146, operable to store, either permanently or temporarily, data, operational software, or other information for a processor. Memory includes any one or a combination of volatile or non-volatile local or remote devices suitable for storing information. For example, a memory may include random access memory (RAM), read only memory (ROM), magnetic storage devices, optical storage devices, semiconductor storage devices, or any other suitable information storage device or a combination of these devices. A memory may include any suitable information for use in the operation of component of system 100. A memory may further include some or all of one or more databases (e.g., database 148).

Logic may perform the operation of any component of system 100, for example, logic executes instructions to generate output from input. Logic may include hardware, software, or other logic. Logic may be encoded in one or more non-transitory, tangible media, such as a computer-readable medium or any other suitable tangible medium, and may perform operations when executed by a computer or processor. Certain logic, such as a processor, may manage the operation of a component.

Modifications, additions, or omissions may be made to system 100. System 100 may include more, fewer, or other components. Any suitable component of system 100 may include a processor, interface, logic, memory, or other suitable element.

Figure 2:
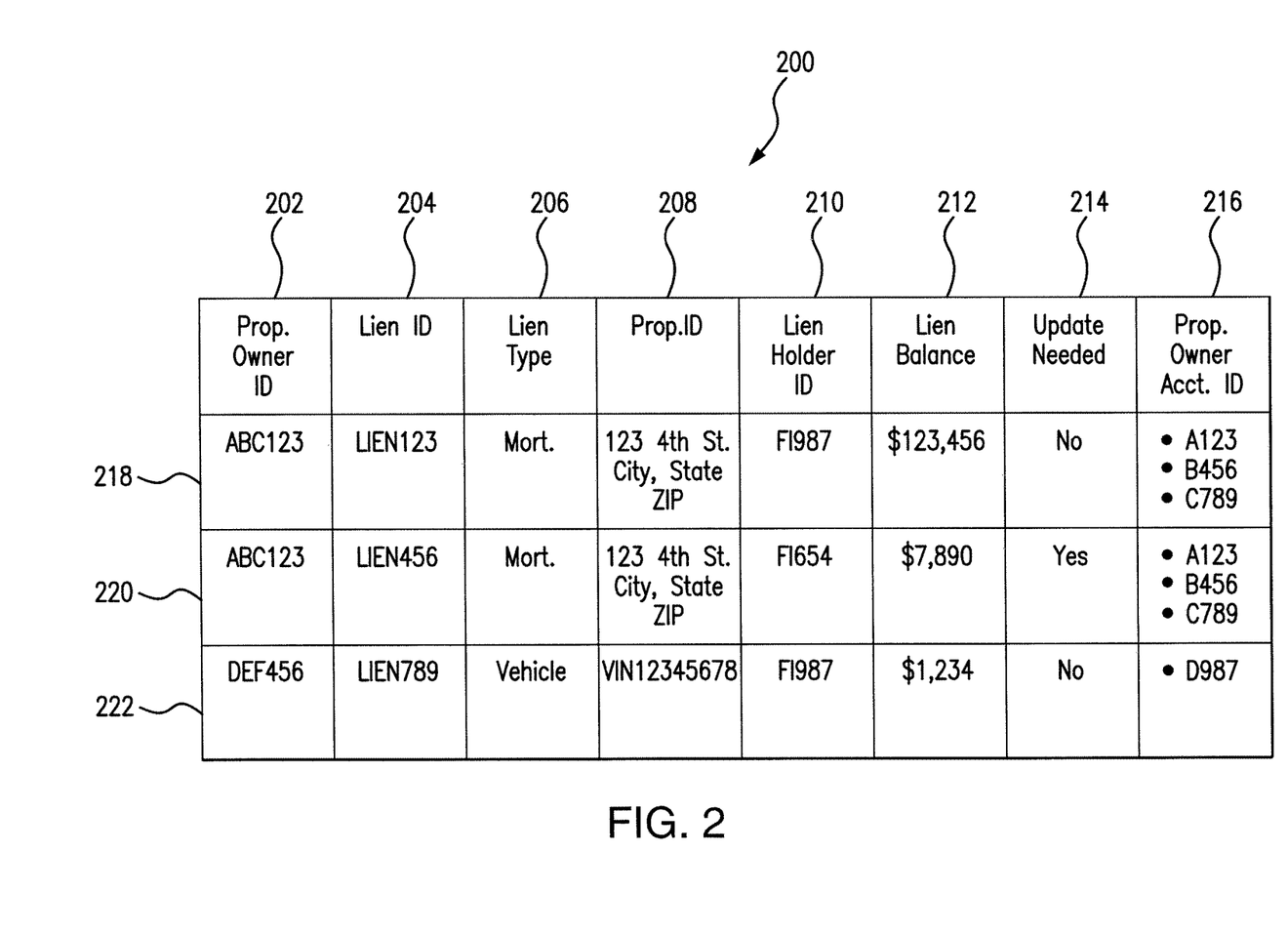
FIG. 2 illustrates a table from a database of an example system for communicating property data.

FIG. 2 illustrates a table 200 from a database of an example system for communicating property data. Table 200 includes property owner ID column 202, lien ID column 204, lien type column 206, property ID column 208, lien holder ID column 210, lien balance column 212, update needed column 214, property owner account ID column 216, and rows 218, 220, and 222. Columns 202-216 may include identifiers. Identifiers represent any suitable indicia operable to identify data and may be operable to uniquely identify data. For example, mailing addresses and vehicle identification numbers ("VINs") may be operable to uniquely identify property and social security numbers may be operable to uniquely identify individuals.

Property owner ID column 202, represents an identifier of a property owner associated with a property identified in column 208. Lien ID column 204 represents an identifier of a lien with a property identified in column 208. Lien type column 206 represents a category of lien (e.g., car, boat, recreational vehicle, motorcycle, first home, second home, business, or other suitable property categorization). Property ID column 208 represents an identifier of a property (e.g., an address or VIN). Lien holder ID column 210 represents an identifier of a lien holder (e.g., member financial institution 120 or third party lien holder 130). Lien balance column 212 represents a debt balance associated with a lien identified in lien ID column 204. Update needed column 214 represents an indication of whether the lien data (e.g., the lien balance) needs to be updated (e.g., the lien balance has not been updated for longer than a payment period associated with a debt repayment schedule associated with the lien). Property owner account ID column 216 represents identifier(s) of account(s) held by member financial institutions 120 associated with the property owner identified in column 202.

Row 218 includes "ABC123" in property owner ID column 202, "LIEN123" in lien ID column 204, "mort." in lien type column 206, "123 4th St. City, State ZIP" in property ID column 208, "FI987" in lien holder ID column 210, "$123,456" in lien balance column 212, "no" in update needed column 214, and "A123, B456, C789" in property owner account ID column 216. Row 218 indicates that a property owner identified as ABC123 has a mortgage lien identified as LIEN123 on a property identified by 123 4th St. City, State ZIP with a lien holder identified by FI987 that has a debt balance of $123,456.00 and that the debt balance information has been updated. Further, the property owner identified as ABC123 has accounts with member financial institutions 120 identified by A123, B456, and C789.

Row 220 includes "ABC123" in property owner ID column 202, "LIEN456" in lien ID column 204, "mort." in lien type column 206, "123 4th St. City, State ZIP" in property ID column 208, "FI654" in lien holder ID column 210, "$7,890" in lien balance column 212, "yes" in update needed column 214, and "A123, B456, C789" in property owner account ID column 216. Row 220 indicates that a property owner identified as ABC123 has a mortgage lien identified as LIEN456 on a property identified by 123 4th St. City, State ZIP with a lien holder identified by FI654 that has a debt balance of $7,890.00 and that the debt balance information needs to be updated. Further, the property owner identified as ABC123 has accounts with member financial institutions 120 identified by A123, B456, and C789.

Row 222 includes "DEF456" in property owner ID column 202, "LIEN789" in lien ID column 204, "vehicle" in lien type column 206, "VIN12345678" in property ID column 208, "FI987" in lien holder ID column 210, "$1,234" in lien balance column 212, "no" in update needed column 214, and "D987" in property owner account ID column 216. Row 222 indicates that a property owner identified as DEF456 has a vehicle lien identified as LIEN456 on a property identified by VIN12345678 with a lien holder identified by FI987 that has a debt balance of $1,234.00 and that the debt balance information is updated. Further, the property owner identified as DEF456 has an account with member financial institutions 120 identified by D987.

Rows 218 and 220 demonstrate that the same property owner can have multiple liens on the same property with different lien holders. In an example, lien holder FI987 may be one of the member financial institutions 120 and has kept the lien balance information updated, while lien holder FI654 may be one of the third party lien holders 130 and has not kept the lien balance updated. Rows 218 and 22 demonstrate that that lien holders may hold multiple different types of liens with different property owners (e.g., lien holder FI987 holds both mortgage and vehicle liens with multiple different property owners). Rows 218, 220, and 222 further demonstrate how unique identifiers (e.g., real estate addresses and VINs) can be used to identify a plurality of liens associate with a property. Further, rows 218, 220, and 222 demonstrate that maintaining updated balances on debt associated with liens, total debt associated with a property can be determined.

Modifications, additions, or omissions may be made to table 200. Table 200 may include more, different, or less fields, and may include any information relevant to communicating and maintaining property data. Table 200 may include any suitable amount of information and may be stored in any suitable type or number of memories.

Figure 3:
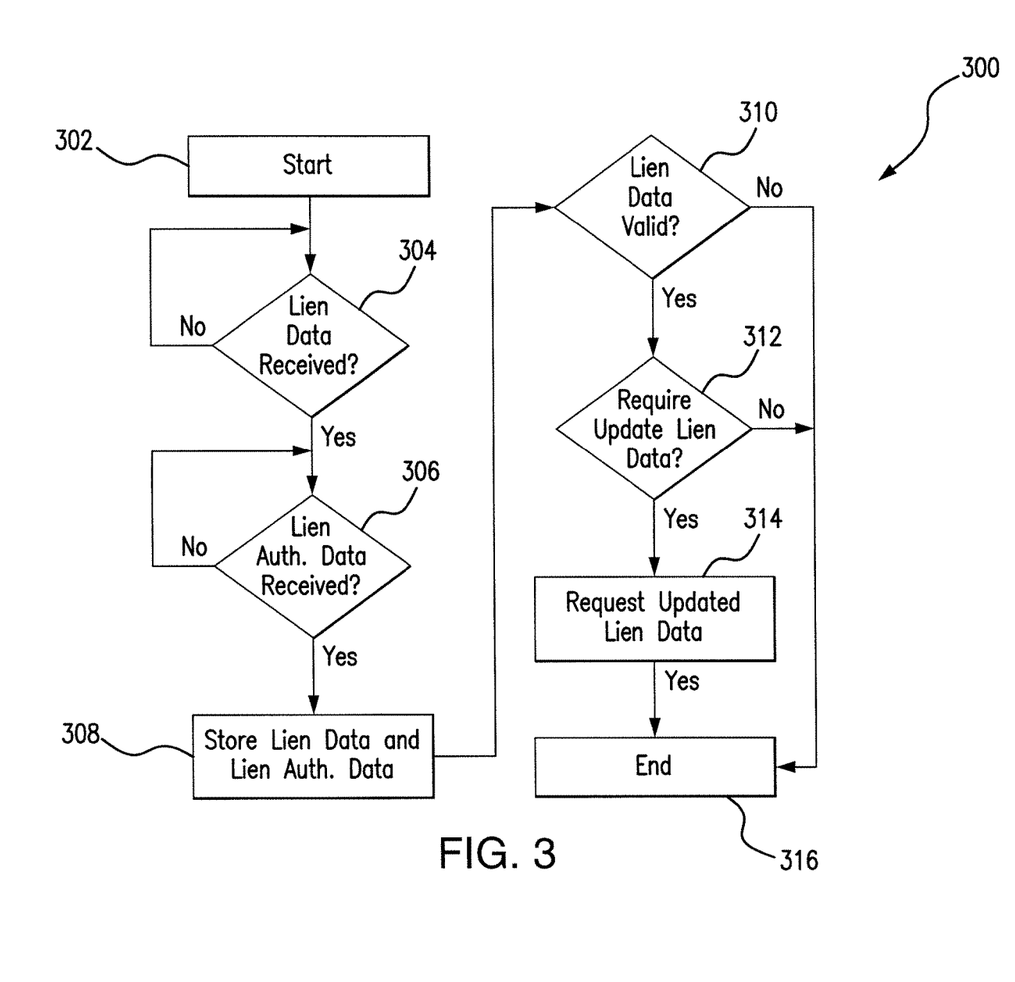
FIG. 3 illustrates a flow diagram of an example method for communicating property data, according to certain embodiments of the present disclosure.

FIG. 3 illustrates a flow diagram of an example method for communicating property data, according to certain embodiments of the present disclosure.

Method 300 begins at step 302. At step 304 it is determined (e.g., by lien holder interface module 140) whether lien data has been received (e.g., from lien holders such as member financial institutions 120 and/or third party lien holders 130). If lien data has not been received, the method returns to step 304. If lien data has been received, the method proceeds to step 306. At step 306, it is determined (e.g., by lien holder interface module 140) whether lien authentication data has been received (e.g., from lien holders such as member financial institutions 120 and/or third party lien holders 130). If lien authentication data has not been received, the method returns to step 306. If lien data has been received, the method proceeds to step 308. At step 308, the received lien data and lien authentication data are stored (e.g., in database 148 of lien holder interface module 140). At step 310, it is determined (e.g., by lien holder interface module 140) whether the received lien data is valid. Validation processes are discussed in more detail above with respect to FIG. 1. If the lien data is not validated, the method ends at step 316. If the lien data is validated, the method proceeds to step 312. At step 312, it is determined (e.g., by lien holder interface module 140) whether updated lien data is required (e.g., from the lien holder). For example, if the current balance of a debt associated with a lien has not been updated within a payment period (e.g., as defined by a debt payment schedule), the current balance may be out of date. If no updated lien data is required, the method ends at step 316. If updated lien data is required, the method proceeds to step 314 and updated lien data is requested (e.g., by lien holder interface module 140) from the lien holder. At step 316 the method ends.

Modifications, additions, or omissions may be made to method 300. The method may include more, fewer, or other steps. Additionally, steps may be performed in any suitable order, in parallel, and/or sequentially. Any suitable component of may perform one or more steps of method 300.

Figure 4:
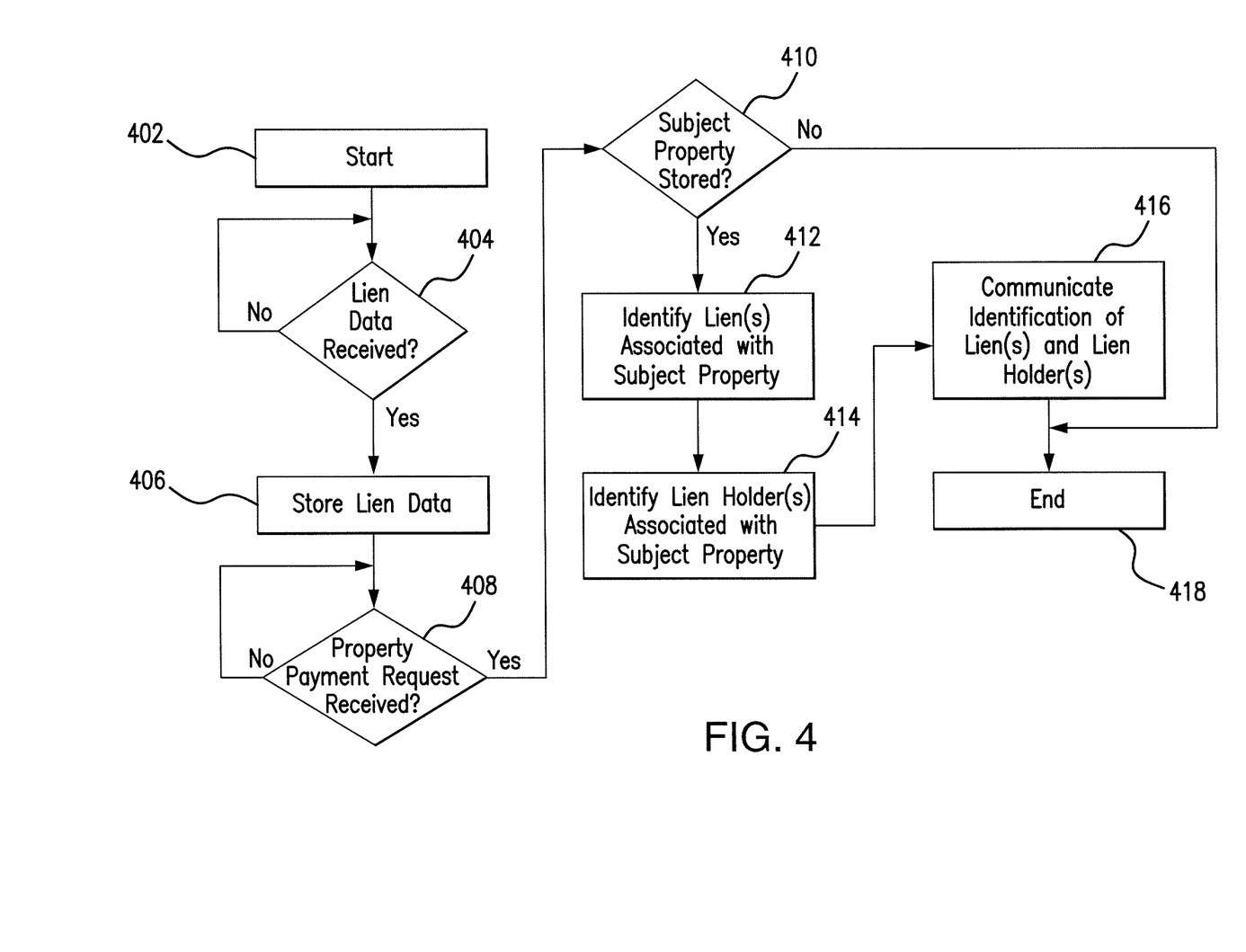
FIG. 4 illustrates a flow diagram of an example method for communicating property data, according to certain embodiments of the present disclosure.

FIG. 4 illustrates a flow diagram of an example method for communicating property data, according to certain embodiments of the present disclosure.

Method 400 begins at step 402. At step 404, it is determined (e.g., by lien holder interface module 140) whether lien data has been received (e.g., from lien holders such as member financial institutions 120 and/or third party lien holders 130). If lien data has not been received, the method returns to step 404. If lien data has been received, the method continues to step 406 and the lien data is stored (e.g., in database 148 of lien holder interface module 140). At step 408, it is determined (e.g., by lien holder interface module 140) whether a property payment request has been received (e.g., by a property insurer, property purchaser, or lender considering the property as collateral). If a property payment request has been received, the method proceeds to step 410. At step 410, it is determined (e.g., by lien holder interface module 140) whether a subject property identified in the property payment request is stored in a database (e.g., database 148 of lien holder interface module 140). If the subject property is not stored, the method ends at step 418. If the subject property is stored, the method proceeds to step 412. At step 412, one or more liens are identified (e.g., by lien holder interface module 140) that are associated with the subject property. At step 414, one or more lien holders are identified (e.g., by lien holder interface module 140) that are associated with the identified liens associated with the subject property. At step 416, the identified liens and lien holders are communicated (e.g., by lien holder interface module 140) to the requesting party. At step 418, method 400 ends.

Modifications, additions, or omissions may be made to method 400. The method may include more, fewer, or other steps. Additionally, steps may be performed in any suitable order, in parallel, and/or sequentially. Any suitable component of may perform one or more steps of method 400.

Certain embodiments of the present disclosure may provide one or more technical advantages having specific technical effects.

In certain embodiments, a system is operable to provide a centralized repository associating property with liens, thereby conserving the computational resources and bandwidth consumed by searching disparate resources to identify liens on a property.

In particular embodiments, a system is operable to determine an amount of debt associated with one or more liens on a property, thereby conserving the computational resources and bandwidth consumed by searching disparate resources to determine an amount of debt associated with a property.

In an embodiment, a system is operable to allocate a payment associated with a property between the property owner and lien holders, thereby conserving the computational resources and bandwidth consumed by searching disparate resources to determine payment allocations for the property owner and lien holders.

Other technical advantages of the present disclosure will be readily apparent to one skilled in the art from the following figures, descriptions, and claims. Moreover, while specific advantages have been enumerated above, various embodiments may include all, some, or none of the enumerated advantages.

What is claimed is:

1. A system for communicating property data, comprising:
one or more memories at a central repository operable to store lien data from a first resource for a plurality of properties, the lien data including:
an identification of a lien on a property;
an identification of the owner of the property;
an identification of the holder of the lien;
a balance of debt associated with the lien;
a repayment schedule for the balance of debt associated with the lien, wherein the first resource is as least one of a commercial bank, a savings and loan association, a credit union, an Internet bank, a mutual fund company, a brokerage firm, or a credit card company; and
lien authenticating data from a second resource, the lien authenticating data including one or more from the set comprising:
an agreement memorializing the lien;
a property title memorializing the lien; and
a government record memorializing the lien, wherein the second resource is independent from the first resource and is at least one of a tax records database, a property records database, or a real estate database, wherein storing the lien data for the property comprises:
storing the identification of the owner of the property in a first column in a table;
storing the identification of the lien on the property in a second column in the table;
storing a type of the lien on the property in a third column in the table;
storing an identification of the property in a fourth column in the table;
storing an identification of the holder of the lien in a fifth column in the table;
storing the balance of debt associated with the lien in a sixth column in the table;
storing an identification of an account belonging to the owner of the property in a seventh column in the table;
one or more interfaces communicatively coupled to the one or more memories, the one or more interfaces operable to receive a first property payment request from a first requesting party and a second property payment request from a second requesting party, the first property payment request including a first identification of a first payment towards a first subject property, the second property payment request including an identification of a second payment towards a second subject property;
one or more processors communicatively coupled to the one or more memories, the one or more processors operable to:
determine that the first subject property is one of the plurality of properties stored on the one or more memories;
determine one or more liens associated with the first subject property;
determine a current balance of debt associated with each of the determined liens for the first subject property;

determine the lien holder for each determined lien associated with the first subject party;

allocate the first payment for the first subject property between a property owner of the first subject property and the determined lien holder;

determine that the second subject property is one of the plurality of properties stored on the one or more memories;

determine a second lien associated with the second subject property;

determine the lien holder for the second lien associated with the second subject property; and determine that a balance of debt associated with the second lien has not been updated for a time period longer than a payment period specified in the repayment schedule for the balance of debt associated with the second lien; and the one or more interfaces further operable to:

communicate the determined one or more liens, the determined current balance of debt for each of the determined one or more liens, and an identification of the lien holder for each of the determined one or more liens to the requesting party; and send a message to the lien holder for the second lien associated with the second subject property requesting an update to the lien data for the second subject property, in response to a determination by the one or more processors that the balance of debt associated with the second lien has not been updated for the time period longer than the payment period specified in the repayment schedule for the balance of debt associated with the second lien.

2. A system for communicating property data, comprising one or more memories at a central repository operable to store lien data from a first resource for a plurality of properties in one or more memories, the lien data including:

an identification of a lien on a property;

an identification of the holder of the lien;

a balance of debt associated with the lien;

a repayment schedule for the balance of debt associated with the lien, wherein the first resource is as least one of a commercial bank, a savings and loan association, a credit union, an Internet bank, a mutual fund company, a brokerage firm, or a credit card company; and lien authenticating data from a second resource, the lien authenticating data including one or more from the set comprising:

an agreement memorializing the lien;

a property title memorializing the lien; and a government record memorializing the lien, wherein the second resource is independent from the first resource and is at least one of a tax records database, a property records database, or a real estate database, wherein storing the lien data for the property comprises:

storing the identification of the owner of the property in a first column in a table;

storing the identification of the lien on the property in a second column in the table;

storing a type of the lien on the property in a third column in the table;

storing an identification of the property in a fourth column in the table;

storing an identification of the holder of the lien in a fifth column in the table;

storing the balance of debt associated with the lien in a six column in the table;

storing an identification of an account belonging to the owner of the property in a seventh column in the table;

one or more interfaces communicatively coupled to the one or more memories, the one or more interfaces operable to receive a first property payment request from a first requesting party and a second property payment request from a second requesting party, the first property payment request including a first identification of a first payment towards a first subject property, the second property payment request including a second identification of a second payment towards a second subject property;

one or more processors communicatively coupled to the one or more memories, the one or more processors operable to:

determine that the first subject property is one of the plurality of properties stored on the one or more memories;

determine one or more liens associated with the first subject property;

determine the lien holder for each determined lien associated with the first subject party;

allocate the first payment for the first subject property between a property owner of the first subject property and the determined lien holder;

determine that the second subject property is one of the plurality of properties stored on the one or more memories;

determine a second lien associated with the second subject property;

determine the lien holder for the second lien associated with the second subject property;

determine that a balance of debt associated with the second lien has not been updated for a time period longer than a payment period specified in the repayment schedule for the balance of debt associated with the second lien; and in response to determining that the balance of debt associated with the second lien has not been updated for the time period long than the payment period specified in the repayment schedule for the balance of debt associated with the second lien, label the lien data for the second subject property inaccurate.

3. The system of claim 2, the one or more processors further operable to determine that the subject property is not one of the plurality of properties stored on the one or more memories; and the one or more interfaces further operable to communicate a message to the requesting party indicating that the subject property is not one of the plurality of properties stored on the one or more memories.

4. The system of claim 2, the payment request further including an identification of a payment amount towards the subject property;

the one or more processors further operable to:

determine the total balance of debt associated with the subject property based on the current balance of debt associated with each of the determined liens for the subject property; and determine the difference between the received payment amount and the determined total balance of debt associated with the subject property.

5. The system of claim 4, the lien data further including an identification of an owner of the property;
the one or more interfaces further operable to receive the payment amount from the requesting party;
the one or more processors further operable to determine that the payment amount is greater than the determined total balance of debt associated with the subject property; and
the one or more interfaces further operable to:
communicate payment of the current balance of debt associated with each of the determined liens for the subject property to each lien holder; and
communicate payment of the different between the payment amount and the determined total balance of debt associated with the subject property.

6. The system of claim 2, the one or more interfaces further operable to communicate the determined one or more liens and an identification of the lien holder for each of the determined one or more liens to the requesting party.

7. The system of claim 6, the one or more processors further operable to determine a current balance of debt associated with each of the determined liens for the subject property; and
the one or more interfaces further operable to communicate the current balance of debt associated with each of the determined liens for the subject property to the requesting party.

8. The system of claim 2, the lien data further including an identification of an owner of the property; and
the one or more processors further operable to determine that the subject property is one of the plurality of properties stored on the one or more memories based on the received identification of the owner of the property.

9. A non-transitory computer-readable medium comprising logic for communicating property data, the logic when executed by a processor operable to:
store lien data from a first resource for a plurality of properties in one or more memories at a central repository, the lien data including:
an identification of a lien on a property;
an identification of the holder of the lien;
a balance of debt associated with the lien;
a repayment schedule for the balance of debt associated with the lien, wherein the first resource is as least one of a commercial bank, a savings and loan association, a credit union, an Internet bank, a mutual fund company, a brokerage firm, or a credit card company; and
lien authenticating data from a second resource, the lien authenticating data including one or more from the set comprising:
an agreement memorializing the lien;
a property title memorializing the lien; and
a government record memorializing the lien, wherein the second resource is independent from the first resource and is at least one of a tax records database, a property records database, or a real estate database,
wherein storing the lien data for the property comprises:
storing the identification of the owner of the property in a first column in a table;
storing the identification of the lien on the property in a second column in the table;
storing a type of the lien on the property in a third column in the table;
storing an identification of the property in a fourth column in the table;
storing an identification of the holder of the lien in a fifth column in the table;
storing the balance of debt associated with the lien in a sixth column in the table;
storing an identification of an account belonging to the owner of the property in a seventh column in the table;
receive a first property payment request from a first requesting party, the first property payment request including a first identification of a first payment towards a first subject property;
determine that the first subject property is one of the plurality of properties stored on the one or more memories;
determine one or more liens associated with the first subject property;
determine the lien holder for each determined lien associated with the first subject party;
allocate the first payment for the first subject property between a property owner of the first subject property and the determined lien holder
receive a second property payment request from a second requesting party, the second property payment request including a second identification of a second payment towards a second subject property;
determine that the second subject property is one of the plurality of properties stored on the one or more memories;
determine a second lien associated with the second subject property;
determine the lien holder for the second lien associated with the second subject property;
determine that a balance of debt associated with the second lien has not been updated for a time period longer than a payment period specified in the repayment schedule for the balance of debt associated with the second lien; and
in response to determining that the balance of debt associated with the second lien has not been updated for the time period longer than the payment period specified in the repayment schedule for the balance of debt associated with the second lien, send a message to the lien holder for the second lien associated with the second subject property requesting an update to the lien data for the second subject property.

10. The non-transitory computer-readable medium of claim 9, the logic further operable to:
determine that the subject property is not one of the plurality of properties stored on the one or more memories; and
communicate a message to the requesting party indicating that the subject property is not one of the plurality of properties stored on the one or more memories.

11. The non-transitory computer-readable medium of claim 9, the payment request further including an identification of a payment amount towards the subject property, and the logic further operable to:
determine the total balance of debt associated with the subject property based on the current balance of debt associated with each of the determined liens for the subject property; and
determine the difference between the received payment amount and the determined total balance of debt associated with the subject property.

12. The non-transitory computer-readable medium of claim 11, the lien data further including an identification of the owner of the property, and the logic further operable to:
receive the payment amount from the requesting party;
determine that the payment amount is greater than the determined total balance of debt associated with the subject property;
communicate payment of the current balance of debt associated with each of the determined liens for the subject property to each lien holder; and
communicate payment of the different between the payment amount and the determined total balance of debt associated with the subject property.

13. The non-transitory computer-readable medium of claim 9, the logic further operable to communicate the determined one or more liens and an identification of the lien holder for each of the determined one or more liens to the requesting party.

14. The non-transitory computer-readable medium of claim 13, the logic further operable to:
determine a current balance of debt associated with each of the determined liens for the subject property; and
communicate the current balance of debt associated with each of the determined liens for the subject property to the requesting party.

15. The non-transitory computer-readable medium of claim 9, the lien data further including an identification of an owner of the property; and the logic further operable to determine that the subject property is one of the plurality of properties stored on the one or more memories based on the received identification of the owner of the property.

16. A method for communicating property data, comprising
storing, by one or more processors, lien data from a first resource for a plurality of properties in one or more memories at a central repository, the lien data including:
an identification of a lien on a property;
an identification of the holder of the lien;
a balance of debt associated with the lien;
a repayment schedule for the balance of debt associated with the lien, wherein the first resource is as least one of a commercial bank, a savings and loan association, a credit union, an Internet bank, a mutual fund company, a brokerage firm, or a credit card company; and
lien authenticating data from a second resource, the lien authenticating data including one or more from the set comprising:
an agreement memorializing the lien;
a property title memorializing the lien; and
a government record memorializing the lien, wherein the second resource is independent from the first resource and is at least one of a tax records database, a property records database, or a real estate database,
wherein storing the lien data for the property comprises:
storing the identification of the owner of the property in a first column in a table;
storing the identification of the lien on the property in a second column in the table;
storing a type of the lien on the property in a third column in the table;
storing an identification of the property in a fourth column in the table;
storing an identification of the holder of the lien in a fifth column in the table;
storing the balance of debt associated with the lien in a sixth column in the table;
storing an identification of an account belonging to the owner of the property in a seventh column in the table;
receiving a first property payment request from a first requesting party, the first property payment request including a first identification of a first payment towards a first subject property;
determining, by one or more processors, that the subject property is one of the plurality of properties stored on the one or more memories;
determining, by one or more processors, one or more liens associated with the subject property;
determining, by one or more processors, the lien holder for each determined lien associated with the subject party;
allocating the payment for the subject property between a property owner of the subject property and the determined lien holder
receiving a second property payment request from second requesting party, the second property payment request including a second identification of a second payment towards a second subject property;
determining that the second subject property is one of the plurality of properties stored on the one or more memories;
determining a second lien associated with the second subject property;
determining the lien holder for the second lien associated with the second subject property;
determining that a balance of debt associated with the second lien has not been updated for a time period longer than a payment period specified in the repayment schedule for the balance of debt associated with the second lien; and
in response to determining that the balance of debt associated with the second lien has not been updated for the time period longer than the payment period specified in the repayment schedule for the balance of debt associated with the second lien, sending a message to the lien holder for the second lien associated with the second subject property requesting an update to the lien data for the second subject property.

17. The method of claim 16, further comprising:
determining, by one or more processors, that the subject property is not one of the plurality of properties stored on the one or more memories; and
communicate a message to the requesting party indicating that the subject property is not one of the plurality of properties stored on the one or more memories.

18. The method of claim 16, the payment request further including an identification of a payment amount towards the subject property, and further comprising:
determining, by one or more processors, the total balance of debt associated with the subject property based on the current balance of debt associated with each of the determined liens for the subject property; and
determining, by one or more processors, the difference between the received payment amount and the determined total balance of debt associated with the subject property.

19. The method of claim 18, the lien data further including an identification of the owner of the property, and further comprising:

receiving the payment amount from the requesting party;

determining, by one or more processors, that the payment amount is greater than the determined total balance of debt associated with the subject property;

communicating payment of the current balance of debt associated with each of the determined liens for the subject property to each lien holder; and communicating payment of the different between the payment amount and the determined total balance of debt associated with the subject property.

20. The method of claim 16, further comprising communicating the determined one or more liens and an identification of the lien holder for each of the determined one or more liens to the requesting party.

* * * * *